(12) United States Patent
Cocchi et al.

(10) Patent No.: US 7,437,571 B1
(45) Date of Patent: Oct. 14, 2008

(54) DEDICATED NONVOLATILE MEMORY

(75) Inventors: Ronald P. Cocchi, Seal Beach, CA (US); Christopher P. Curren, Brentwood, CA (US); Raynold M. Kahn, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 816 days.

(21) Appl. No.: 10/085,920

(22) Filed: Feb. 28, 2002

(51) Int. Cl.
*G06F 12/14* (2006.01)
*G06F 21/00* (2006.01)
*G06F 21/02* (2006.01)

(52) U.S. Cl. .................. 713/193; 713/189; 713/193; 713/194; 711/152; 711/5; 711/6; 726/26; 726/27

(58) Field of Classification Search .................. 703/193
See application file for complete search history.

(56) References Cited

U.S. PATENT DOCUMENTS

| | | |
|---|---|---|
| 4,580,161 A | 4/1986 | Petrus et al. |
| 4,586,162 A | 4/1986 | Murai |
| 4,792,972 A | 12/1988 | Cook, Jr. |
| 4,890,319 A | 12/1989 | Seth-Smith et al. |
| 4,908,834 A | 3/1990 | Wiedemer |
| 5,222,141 A | 6/1993 | Killian |
| 5,237,610 A | 8/1993 | Gammie et al. |
| 5,282,249 A * | 1/1994 | Cohen et al. ............... 380/229 |
| 5,331,412 A | 7/1994 | Farmer et al. |
| 5,781,226 A | 7/1998 | Sheehan |
| 5,867,644 A | 2/1999 | Ranson et al. |
| 5,886,730 A | 3/1999 | Tsosie |
| 6,026,020 A | 2/2000 | Matsubara |
| 6,035,037 A | 3/2000 | Chaney |
| 6,035,038 A | 3/2000 | Campinos et al. |
| 6,069,647 A | 5/2000 | Sullivan et al. |
| 6,154,819 A | 11/2000 | Larsen et al. |
| 6,157,719 A * | 12/2000 | Wasilewski et al. ......... 380/210 |
| 6,230,244 B1 | 5/2001 | Kai |
| 6,240,495 B1 | 5/2001 | Usui |
| 6,278,633 B1 | 8/2001 | Wong et al. |
| 6,289,455 B1 * | 9/2001 | Kocher et al. ............... 713/194 |
| 6,334,216 B1 | 12/2001 | Barth |

(Continued)

FOREIGN PATENT DOCUMENTS

EP        0 851 358        7/1998

(Continued)

OTHER PUBLICATIONS

Araki, Shigeo, "The Memory Stick", IEEE Micro, ISSN: 0272-1732, vol. 20, No. 4, Jul. 2000-Aug. 2000, pp. 40-46, XP002257044.

(Continued)

*Primary Examiner*—Syed A. Zia

(57) ABSTRACT

One or more embodiments of the invention provide a method, apparatus, and article of manufacture for limiting unauthorized access to digital services. A protected nonvolatile memory component is configured. The protected nonvolatile memory component is used to contain state information to provide desired functionality and enforce one or more security policies for accessing the digital services. Additionally, the protected nonvolatile memory component and a microprocessor's nonvolatile memory component share a programming charge pump and programming control. Access to the nonvolatile memory component is then controlled through a fixed state custom logic block.

28 Claims, 7 Drawing Sheets

U.S. PATENT DOCUMENTS

| | | | |
|---|---|---|---|
| 6,853,385 | B1 | 2/2005 | MacInnis et al. |
| 2002/0073428 | A1 | 6/2002 | Gurevich et al. |
| 2002/0145931 | A1 | 10/2002 | Pitts |
| 2003/0046686 | A1 | 3/2003 | Candelore et al. |
| 2004/0016002 | A1 | 1/2004 | Handelman et al. |

FOREIGN PATENT DOCUMENTS

| | | |
|---|---|---|
| EP | 0 971 361 | 1/2000 |
| EP | 0 984 403 | 3/2000 |
| EP | 1 050 821 | 11/2000 |
| EP | 1 074 906 | 2/2001 |
| EP | 1 085 516 | 3/2001 |
| EP | 1 176 826 | 1/2002 |
| WO | WO 00 77717 | 12/2000 |
| WO | WO 02 093332 | 11/2002 |

OTHER PUBLICATIONS

"Functional Model of a Conditional Access System", EBU Review-Technical, European Broadcasting Union, Brussels, Belgium, No. 266, Dec. 21, 1995, pp. 64-77, XP000559450.

Khouri, Osama, et al., "Low Output Resistance Charge Pump for Flash Memory Programming", IEEE International workshop on Memory Technology, Design and Testing (MTDT '01), San Jose, USA.

U.S. Appl. No. 10/085,860, filed Feb. 28, 2002, Ronald Cocchi, Date of Notice of Allowance May 17, 2007.

Michael Robin et al., *Digital Television Fundamentals—Design And Installation Of Video And Audio Systems*, McGraw-Hill, Chapter 8, title page(s) and pp. 345-425, 2000.

Microsoft Computer Dictionary, 5th Edition, p. 353, May 1, 2002.

Notice of Allowance dated Feb. 5, 2008 in U.S. Appl. No. 10/085,346 filed Feb. 28, 2002 by Ronald P. Cocchi et al.

Non-final Office Action dated Feb. 21, 2008 in U.S. Appl. No. 10/085,331 filed Feb. 28, 2002 by Ronald P. Cocchi et al.

EPO Communication dated Aug. 2, 2004 in European counterpart Application No. 03004321.0 of corresponding U.S. Appl. No. 10/085,920 filed Feb. 28, 2002 by Ronald P. Cocchi et al.

Israel Office Action dated Apr. 25, 2006 in Israel counterpart Application No. 154,658 of corresponding U.S. Appl. No. 10/085,920 filed Feb. 28, 2002 by Ronald P. Cocchi et al. (original and English translation).

Advisory Action dated Oct. 10, 2007 in U.S. Appl. No. 10/085,331 filed Feb. 28, 2002 by Ronald P. Cocchi et al.

Final Rejection dated Jul. 17, 2007 in U.S. Appl. No. 10/085,331 filed Feb. 28, 2002 by Ronald P. Cocchi et al.

Non-final Office Action dated Jan. 19, 2007 in U.S. Appl. No. 10/085,331 filed Feb. 28, 2002 by Ronald P. Cocchi et al.

Advisory Action dated Dec. 8, 2006 in U.S. Appl. No. 10/085,331 filed Feb. 28, 2002 by Ronald P. Cocchi et al.

Final Rejection dated Sep. 19, 2006 in U.S. Appl. No. 10/085,331 filed Feb. 28, 2002 by Ronald P. Cocchi et al.

Non-final Office Action dated Dec. 13, 2006 in U.S. Appl. No. 10/085,331 filed Feb. 28, 2002 by Ronald P. Cocchi et al.

EPO Communication dated Jul. 12, 2004 in European counterpart Application No. 03 004 322.88 of U.S. Appl. No. 10/085,331 filed Feb. 28, 2002 by Ronald P. Cocchi et al.

Israel Office Action dated Aug. 24, 2006 in Israel counterpart Application No. 154,657 of U.S. Appl. No. 10/085,331 filed Feb. 28, 2002 by Ronald P. Cocchi et al.

Notice of Panel Decision from Pre-Appeal Brief Review dated Dec. 11, 2006 in U.S. Appl. No. 10/085,860 filed Feb. 28, 2002 by Ronald P. Cocchi et al.

Advisory Action dated Oct. 27, 2006 in U.S. Appl. No. 10/085,860 filed Feb. 28, 2002 by Ronald P. Cocchi et al.

Final Rejection dated Aug. 15, 2006 in U.S. Appl. No. 10/085,860 filed Feb. 28, 2002 by Ronald P. Cocchi et al.

Non-final Office Action dated Mar. 30, 2006 in U.S. Appl. No. 10/085,860 filed Feb. 28, 2002 by Ronald P. Cocchi et al.

Non-final Office Action dated Oct. 18, 2005 in U.S. Appl. No. 10/085,860 filed Feb. 28, 2002 by Ronald P. Cocchi et al.

EPO Communication dated Jul. 12, 2004 in European counterpart Application No. 03 004 320.2 of U.S. Appl. No. 10/085,860 filed Feb. 28, 2002 by Ronald P. Cocchi et al.

Israel Office Action dated Dec. 31, 2007 in Israel counterpart Application No. 154,659 of U.S. Appl. No. 10/085,860 filed Feb. 28, 2002 by Ronald P. Cocchi et al.

Non-final Office Action dated Aug. 21, 2007 in U.S. Appl. No. 10/085,346 filed Feb. 28, 2002 by Ronald P. Cocchi et al.

Final Rejection dated Jan. 12, 2007 in U.S. Appl. No. 10/085,346 filed Feb. 28, 2002 by Ronald P. Cocchi et al.

Non-final Office Action dated Jul. 24, 2006 in U.S. Appl. No. 10/085,346 filed Feb. 28, 2002 by Ronald P. Cocchi et al.

Final Rejection dated Mar. 28, 2006 in U.S. Appl. No. 10/085,346 filed Feb. 28, 2002 by Ronald P. Cocchi et al.

Non-final Office Action dated Oct. 3, 2005 in U.S. Appl. No. 10/085,346 filed Feb. 28, 2002 by Ronald P. Cocchi et al.

EPO Communication dated Aug. 2, 2004 in European counterpart Application No. 03 004 319.4 in U.S. Appl. No. 10/085,346 filed Feb. 28, 2002 by Ronald P. Cocchi et al.

\* cited by examiner

DEDICATED NONVOLATILE MEMORY

CROSS-REFERENCE TO RELATED APPLICATIONS

This application is related to the following co-pending and commonly-assigned patent applications, which applications are incorporated by reference herein:

U.S. patent application Ser. No. 10/085,331, entitled "MULTIPLE NONVOLATILE MEMORIES", by Ronald Cocchi, et. al., filed on the same date herewith;

U.S. patent application Ser. No. 10/085,346, entitled "HIDDEN IDENTIFICATION", by Ronald Cocchi, et. al., filed on the same date herewith; and U.S. patent application Ser. No. 10/085,860, entitled "ASYNCHRONOUS CONFIGURATION", by Ronald Cocchi, et. al., filed on the same date herewith.

BACKGROUND OF THE INVENTION

1. Field of the Invention

The present invention relates to systems and methods for preventing unauthorized access to digital services and in particular to a method and system for protecting on-chip nonvolatile memory through dedicating its use to a custom logic block.

2. Description of the Related Art

Digital services such as television programs and information regarding those programs (e.g., a program guide) are distributed to users by a variety of broadcasting methods. Such services may be proprietary and available on a subscription basis. To prevent unauthorized access to the services, a plethora of security mechanisms are utilized. Such mechanisms may store information in memory, wherein the information is used to validate a user or provide access. However, persons often attempt to obtain illegal/unauthorized access to the services by altering the memory contents. What is needed is the capability to prevent or increase the difficulty of obtaining illegal access to the information and digital services. These problems may be better understood by a description of current broadcasting methods, security mechanisms, and methods for obtaining unauthorized access to such services.

As described above, television programs and digital services are distributed to viewers by a variety of broadcasting methods. These methods include traditional analog broadcast television (National Television Systems Committee or "NTSC" standard), the soon to be required digital broadcast television (Advanced Television Systems Committee or "ATSC" standard), cable television (both analog and digital), satellite broadcasting (both analog and digital), as well as other methods. These methods allow channels of television content to be multiplexed and transmitted over a common transmission medium.

To view the television programming and have access to the digital services, users commonly have a set top box (also referred to as an integrated receiver/decoder [IRD]). Within the system or set top box, a security component/microcircuit known as a smart card may be utilized to prevent unauthorized access to the television programs and digital services. The smart card microcircuit may contain a microprocessor, volatile memory components, a nonvolatile memory component, and a system input/output module.

Nonvolatile memory has been used extensively throughout the electronics industry. For example, in the IRD, the microprocessor utilizes nonvolatile memory to contain state information (e.g., status information) used to provide the desired functionality and enforce security policies intended by the designers. The microprocessor and/or a memory access control unit utilized by the microprocessor restricts access to the memory components.

However, there have been numerous attempts by individuals or companies (i.e., hackers or attackers) to attack, misuse, or modify the nonvolatile memory through external means of reprogramming or otherwise altering the contents of the memory when the memory component has been available to the central processor or otherwise on the system bus. For example, attacks using unforeseen methods or subverting poorly implemented defenses can be used to gain unauthorized access to the contents of the memory and/or lead to reprogramming the contents of the memory. Reprogramming or unauthorized access to the memory contents can lead to complete compromise of the security features intended in the device.

The simplest and most prevalent form of attack against the memory components uses external noninvasive means using a system's input/output module due to the low cost of the equipment required to implement this form of attack. Most attacks occur by inappropriate manipulation of a microprocessor or memory access control unit. For example, memory contents have been subverted when a memory access control unit (that controls access to a memory component) has been compromised. Once the single memory component has been breached, the attacker may then have the capability to access all memory address locations that reside other memory components.

SUMMARY OF THE INVENTION

Digital services systems often contain a service module known as a smart card to prevent unauthorized access to the services. The smart card microcircuit contains a microprocessor, volatile memory components, nonvolatile memory components, a custom logic block, and a system input/output module. The security system may be compromised if memory components are used or attacked in unattended ways typically through the system input/output module.

One or more embodiments of the invention provide a method, apparatus, and article of manufacture for protecting on-chip nonvolatile memory through dedicating use of the nonvolatile memory to a custom logic block. The custom logic block has a fixed algorithm and cannot be altered by external means. Since the custom logic block cannot be altered, access to the protected nonvolatile memory component is limited to the functions contained within the custom logic block and the memory component is not subject to external manipulation.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description reference is made to the accompanying drawings which form a part hereof and which show, by way of illustration, several embodiments of the present invention. It is understood that other embodiments may be utilized and structural changes may be made without departing from the scope of the present invention.

Overview

A modifiable protected nonvolatile memory component is dedicated to a custom logic block. The protected nonvolatile memory component is not accessible through the system I/O module, system bus, microprocessor, or external environment except as necessary during the manufacturing process. This memory component is programmed by the custom logic block and cannot be reprogrammed by the microprocessor or by external manipulation through the system I/O module.

Video Distribution System

Figure 1:
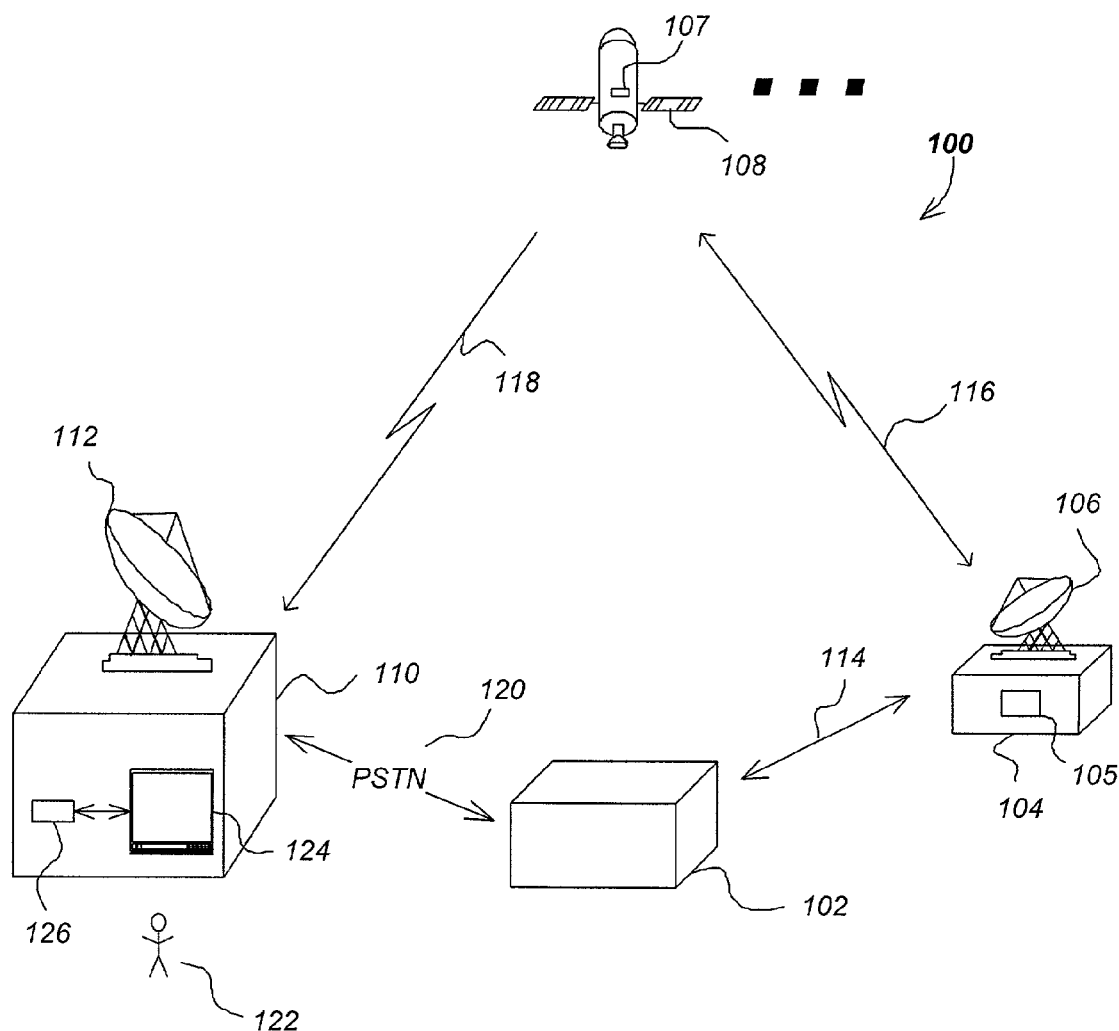
FIG. 1 is a diagram showing an overview of a video distribution system.

FIG. 1 is a diagram illustrating an overview of a single satellite video distribution system 100. The video distribution system 100 comprises a control center 102 in communication with an uplink center 104 via a ground or other link 114 and with a subscriber receiver station 110 via a public switched telephone network (PSTN) or other link 120. The control center 102 provides program material (e.g. digital services, video programs, audio programs and data) to the uplink center 104 and coordinates with the subscriber receiver stations 110 to offer, for example, pay-per-view (PPV) program services, including billing and associated decryption of video programs.

The uplink center 104 receives program material and program control information from the control center 102, and using an uplink antenna 106 and transmitter 105, transmits the program material and program control information to the satellite 108 via uplink 116. The satellite receives and processes this information, and transmits the video programs and control information to the subscriber receiver station 110 via downlink 118 using transmitter 107. The subscriber receiving station 110 receives this information using the outdoor unit (ODU) 112, which includes a subscriber antenna and a low noise block converter (LNB).

The subscriber receiving station 110 permits the use/viewing of the information by a subscriber 122. For example, the information may be used/viewed on a television 124 or other display device. To control access to the information, the subscriber receiving station 110 includes an integrated receiver/decoder (IRD) 126. In embodiments of the invention, the IRD 126 is communicatively coupled to a security component known as a conditional access module or smart card that controls access to the information/digital services.

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite-based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprising purely audio information or other data as well.

Uplink Configuration

Figure 2:
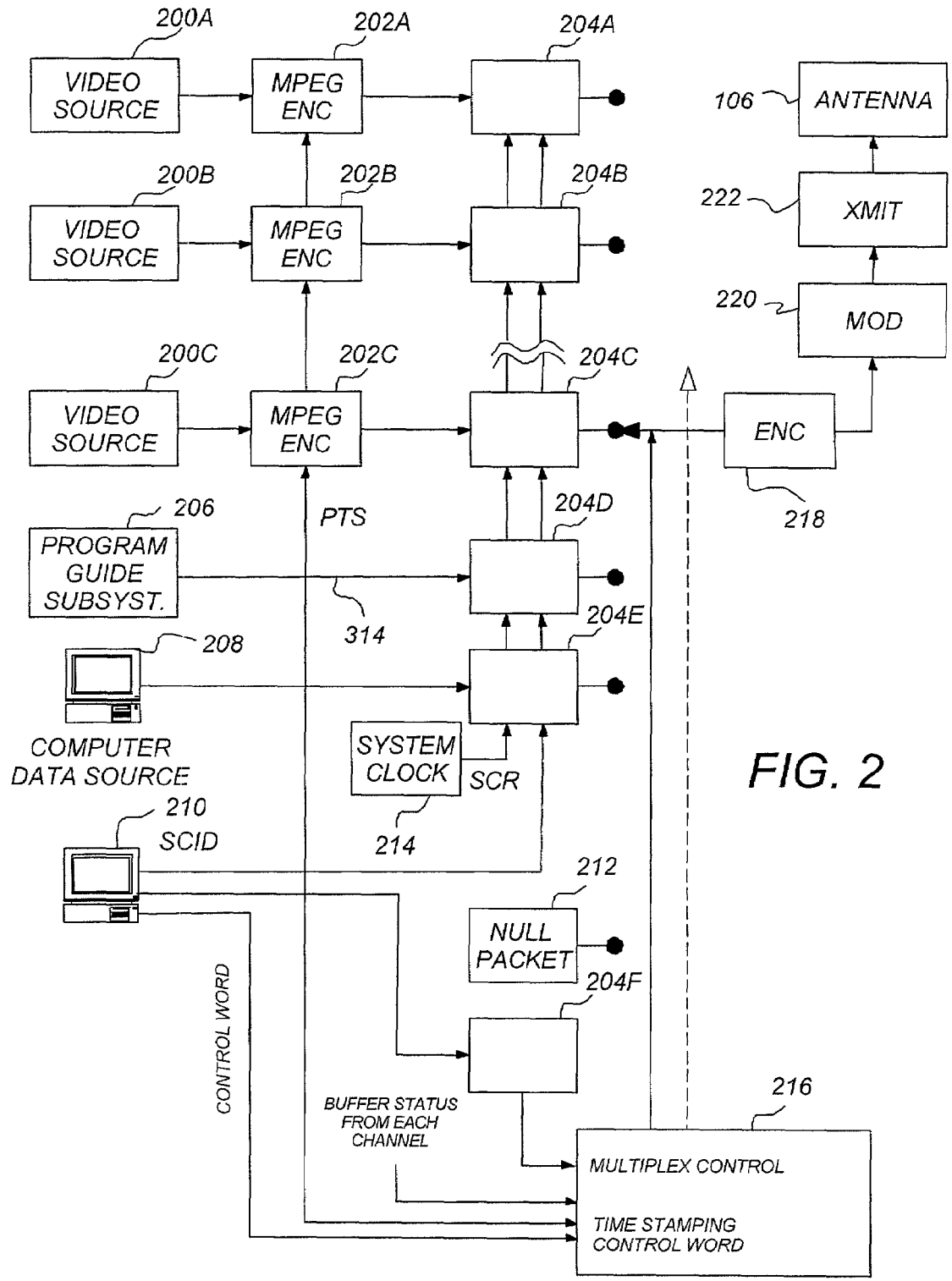
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), a data channel from a program guide subsystem 206 and computer data information from a computer data source 208.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200.

The data packets are assembled using a reference from the system clock 214 (SCR), and from the conditional access manager 210, which provides the SCID to the packetizers 204 for use in generating the data packets. These data packets are then multiplexed into serial data and transmitted.

Program Guide Subsystem

Figure 3:
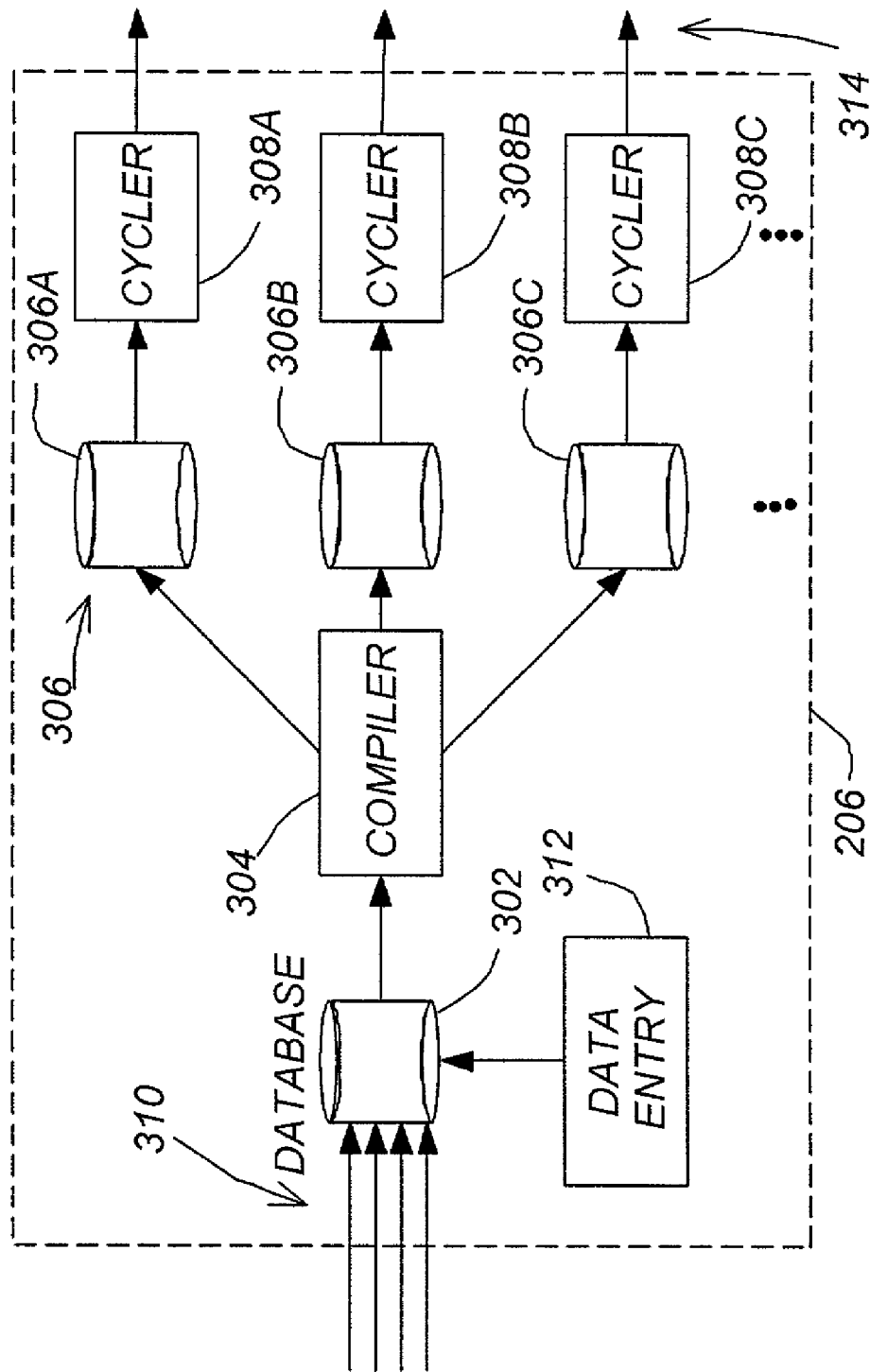
FIG. 3 is a block diagram of one embodiment of the program guide subsystem.

FIG. 3 is a block diagram of one embodiment of the program guide subsystem 206. The program guide data transmitting system 206 includes program guide database 302, compiler 304, sub-databases 306A-306C (collectively referred to as sub-databases 306) and cyclers 308A-308C (collectively referred to as cyclers 308).

Schedule feeds 310 provide electronic schedule information about the timing and content of various television channels, such as that found in television schedules contained in newspapers and television guides. Schedule feeds 310 preferably include information from one or more companies that specialize in providing schedule information, such as TRIBUNE MEDIA SERVICES™, and T.V. DATA™. The data provided by companies such as TRIBUNE MEDIA SERVICES™ and T.V. DATA™ are typically transmitted over telephone lines to program guide database 302. These companies provide television schedule data for all of the television stations across the nation plus the nationwide channels, such as SHOWTIME™, HBO™, and the DISNEY CHANNEL™. The specific format of the data that are provided by these companies varies from company to company. Program guide database 302 preferably includes schedule data for television channels across the entire nation including all nationwide channels and local channels, regardless of whether the channels are transmitted by the transmission station.

Program guide database 302 is a computer-based system that receives data from schedule feeds 310 and organizes the data into a standard format. Compiler 304 reads the standard form data out of program guide database 302, identifies common schedule portions, converts the program guide data into the proper format for transmission to users (specifically, the program guide data are converted into objects as discussed below) and outputs the program guide data to one or ore of sub-databases 306.

Program guide data can also be manually entered into program guide database 302 through data entry station 312. Data entry station 312 allows an operator to enter additional scheduling information, as well as combining and organizing data supplied by the scheduling companies. As with the computer organized data, the manually entered data are converted by the compiler into separate objects and sent to one or more of sub-databases 306.

The program guide objects are temporarily stored in sub-databases 306 until cyclers 308 request the information. Each of cyclers 308 may transmit objects at a different rate than the other cyclers 308. For example, cycler 308A may transmit objects every second, while cyclers 308B and 308C may transmit objects every 5 seconds and every 10 seconds, respectively.

Since the subscriber's receivers may not always be on and receiving and saving objects, the program guide information is continuously re-transmitted. Program guide objects for programs that will be shown in the next couple of hours are sent more frequently than program guide objects for programs that will be shown later. Thus, the program guide objects for the most current programs are sent to a cycler 308 with a high rate of transmission, while program guide objects for later programs are sent to cyclers 308 with a lower rate of transmission. One or more of the data outputs 314 of the cyclers 308 are forwarded to the packetizer of a particular transponder, as depicted in FIG. 2.

It is noted that the uplink configuration depicted in FIG. 2 and the program guide subsystem depicted in FIG. 3 can be implemented by one or more hardware modules, one or more software modules defining instructions performed by a processor, or a combination of both.

Broadcast Data Stream Format and Protocol

Figure 4A:
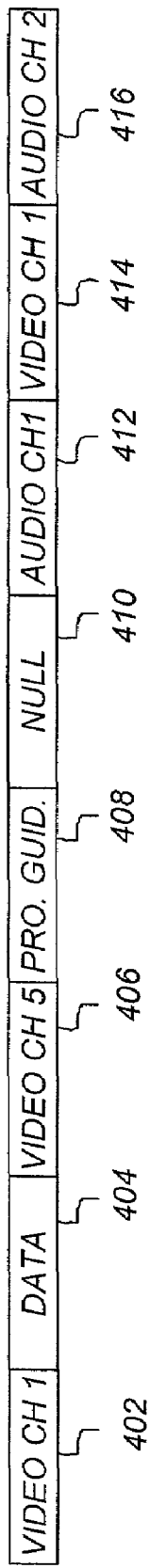
FIG. 4A is a diagram of a representative data stream received from a satellite.

FIG. 4A is a diagram of a representative data stream. The first packet segment 402 comprises information from video channel 1 (data coming from, for example, the first video program source 200A). The next packet segment 404 comprises computer data information that was obtained, for example from the computer data source 208. The next packet segment 406 comprises information from video channel 5 (from one of the video program sources 200). The next packet segment 408 comprises program guide information such as the information provided by the program guide subsystem 206. As shown in FIG. 4A, null packets 410 created by the null packet module 212 may be inserted into the data stream as desired.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver 126 receives these signals, and using the SCID, reassembles the packets to regenerate the program material for each of the channels.

Figure 4B:
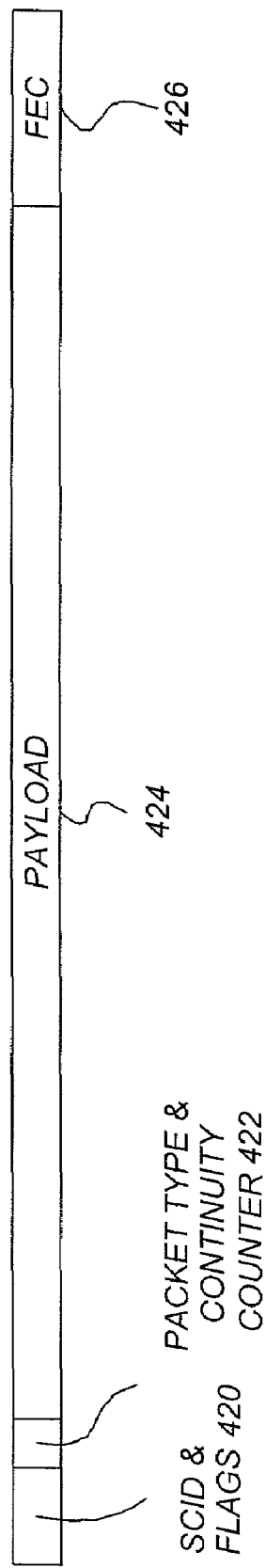
FIG. 4B is a diagram illustrating the structure of a data packet.

FIG. 4B is a diagram of a data packet. Each data packet (e.g. 402-416) is 147 bytes long, and comprises a number of packet segments. The first packet segment 420 comprises two bytes of information containing the SCID and flags. The SCID is a unique 12-bit number that uniquely identifies the data packet's data channel. The flags include 4 bits that are used to control other features. The second packet segment 422 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 424 comprises 127 bytes of payload data, which in the cases of packets 402 or 406 is a portion of the video program provided by the video program source 200. The final packet segment 426 is data required to perform forward error correction.

Integrated Receiver/Decoder

Figure 5:
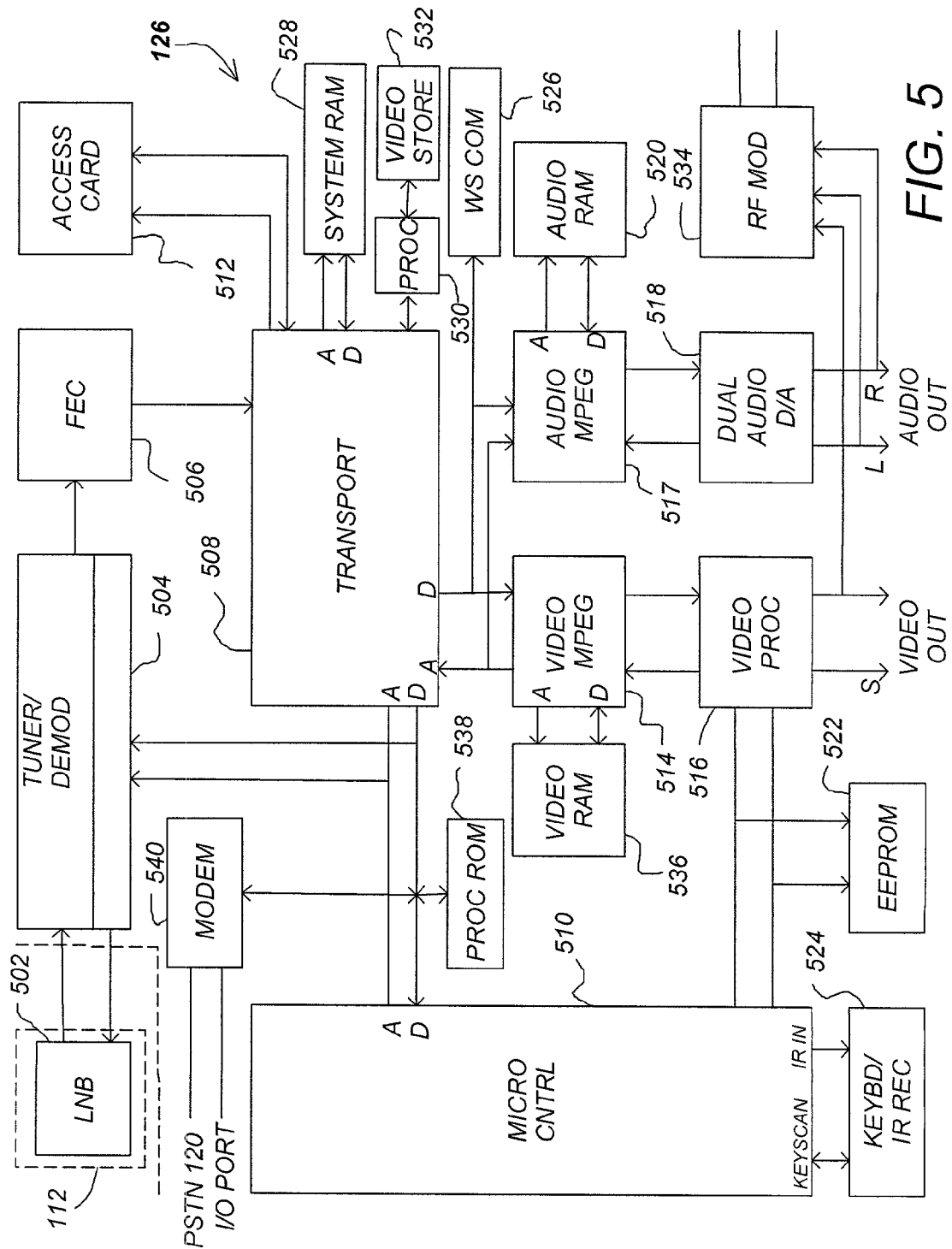
FIG. 5 is a block diagram of one embodiment of an integrated receiver/decoder.

FIG. 5 is a block diagram of an integrated receiver/decoder (IRD) 126 (also hereinafter alternatively referred to as receiver 126 or a set top box). The receiver 126 comprises a tuner/demodulator 504 communicatively coupled to an ODU 112 having one or more LNBs 502. The LNB 502 converts the 12.2- to 12.7 GHz downlink 118 signal from the satellites 108 to, e.g. a 950-1450 MHz signal required by the IRD's 126 tuner/demodulator 504. The LNB 502 may provide either a dual or a single output. The single-output LNB 502 has only one RF connector, while the dual output LNB 502 has two RF output connectors and can be used to feed a second tuner 504, a second receiver 126, or some other form of distribution system.

The tuner/demodulator 504 isolates a single, digitally modulated 24 MHz transponder, and converts the modulated data to a digital data stream. The digital data stream is then supplied to a forward error correction (FEC) decoder 506. This allows the IRD 126 to reassemble the data transmitted by the uplink center 104 (which applied the forward error correction to the desired signal before transmission to the subscriber receiving station 110) verifying that the correct data signal was received, and correcting errors, if any. The error-corrected data may be fed from the FEC decoder module 506 to the transport module 508 via an 8-bit parallel interface.

The transport module 508 performs many of the data processing functions performed by the IRD 126. The transport module 508 processes data received from the FEC decoder module 506 and provides the processed data to the video MPEG decoder 514 and the audio MPEG decoder 517. In one embodiment of the present invention, the transport module, video MPEG decoder and audio MPEG decoder are all implemented on integrated circuits. This design promotes both space and power efficiency, and increases the security of the functions performed within the transport module 508. The transport module 508 also provides a passage for communications between the microcontroller 510 and the video and audio MPEG decoders 514, 517. As set forth more fully hereinafter, the transport module also works with the conditional access module (CAM) 512 to determine whether the subscriber receiving station 110 is permitted to access certain program material. Data from the transport module can also be supplied to external communication module 526.

The CAM 512 functions in association with other elements to decode an encrypted signal from the transport module 508. The CAM 512 may also be used for tracking and billing these services. In one embodiment of the present invention, the CAM 512 is a smart card, having contacts cooperatively interacting with contacts in the IRD 126 to pass information. In order to implement the processing performed in the CAM 512, the IRD 126, and specifically the transport module 508 provides a clock signal to the CAM 512. Details of the CAM 512 architecture are described below.

Video data is processed by the MPEG video decoder 514. Using the video random access memory (RAM) 536, the MPEG video decoder 514 decodes the compressed video data and sends it to an encoder or video processor 516, which converts the digital video information received from the video MPEG module 514 into an output signal usable by a display or other output device. By way of example, processor 516 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if high definition programming is processed.

Audio data is likewise decoded by the MPEG audio decoder 517. The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats may similarly be supported. For example, other audio formats such as multi-channel DOLBY DIGITAL AC-3 may be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microcontroller 510 receives and processes command signals from the remote control 524, an IRD 126 keyboard interface, and/or another input device. The microcontroller receives commands for performing its operations from a processor programming memory, which permanently stores such instructions for performing such commands. The processor programming memory may comprise a read only memory (ROM) 538, an electrically erasable programmable read only memory (EEPROM) 522 or, similar memory device. The microcontroller 510 also controls the other digital devices of the IRD 126 via address and data lines (denoted "A" and "D" respectively, in FIG. 5).

The modem 540 connects to the customer's phone line via the PSTN port 120. It calls, e.g. the program provider, and transmits the customer's purchase information for billing purposes, and/or other information. The modem 540 is controlled by the microprocessor 510. The modem 540 can output data to other I/O port types including standard parallel and serial computer I/O ports.

The present invention also comprises a local storage unit such as the video storage device 532 for storing video and/or audio data obtained from the transport module 508. Video storage device 532 can be a hard disk drive, a read/writeable compact disc of DVD, a solid state RAM, or any other storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video data from the video storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microcontroller 510 can also perform the operations required to store and or retrieve video and other data in the video storage device 532.

The video processing module 516 input can be directly supplied as a video output to a viewing device such as a video or computer monitor. In addition, the video and/or audio outputs can be supplied to an RF modulator 534 to produce an RF output and/or 8 vestigal side band (VSB) suitable as an input signal to a conventional television tuner. This allows the receiver 126 to operate with televisions without a video output.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the IRD 126 also receives and stores a program guide in a memory available to the microcontroller 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite transponders and service channel identifications (SCIDs), and also provide TV program listing information to the subscriber 122 identifying program events.

The functionality implemented in the IRD 126 depicted in FIG. 5 can be implemented by one or more hardware modules, one or more software modules defining instructions performed by a processor, or a combination of both.

Access Card

A CAM 512 often contains a microprocessor, memory components (a volatile component and a nonvolatile component) and a system input/output module to communicate with transport 508. Traditional microprocessors within a CAM 512 have nonvolatile memory to contain state that is used to provide the desired functionality and enforce security policies intended by the designers. The microprocessor and/or a memory access control unit restricts access to the memory components.

As described above, attacks may use unforeseen methods or may subvert poorly implemented defenses to gain unauthorized access to the contents of the memory and/or lead to reprogramming the contents of the memory. For example, most attacks occur by inappropriate manipulation of the microprocessor or memory access control unit. Reprogramming or unauthorized access to the memory contents can lead to complete compromise of the security features intended in the CAM 512. The simplest and most prevalent form of attack against the memory component uses external means using the system input/output module due to the low cost of the equipment required to implement this form of attack.

To avoid this method of attack, access to a protected nonvolatile memory component (also referred to as a dedicated nonvolatile memory component) is controlled through a fixed state custom logic block. The custom logic block is implemented in solid state hardware that implements a simple and well defined state machine. The functions defined in the custom logic block specify a handful of well-defined operations that may be performed on the protected nonvolatile memory component. By preventing the system I/O module, system bus, microprocessor, or memory access control unit from direct access to the protected nonvolatile memory component, the previously successful attacks are no longer possible.

Figure 6:
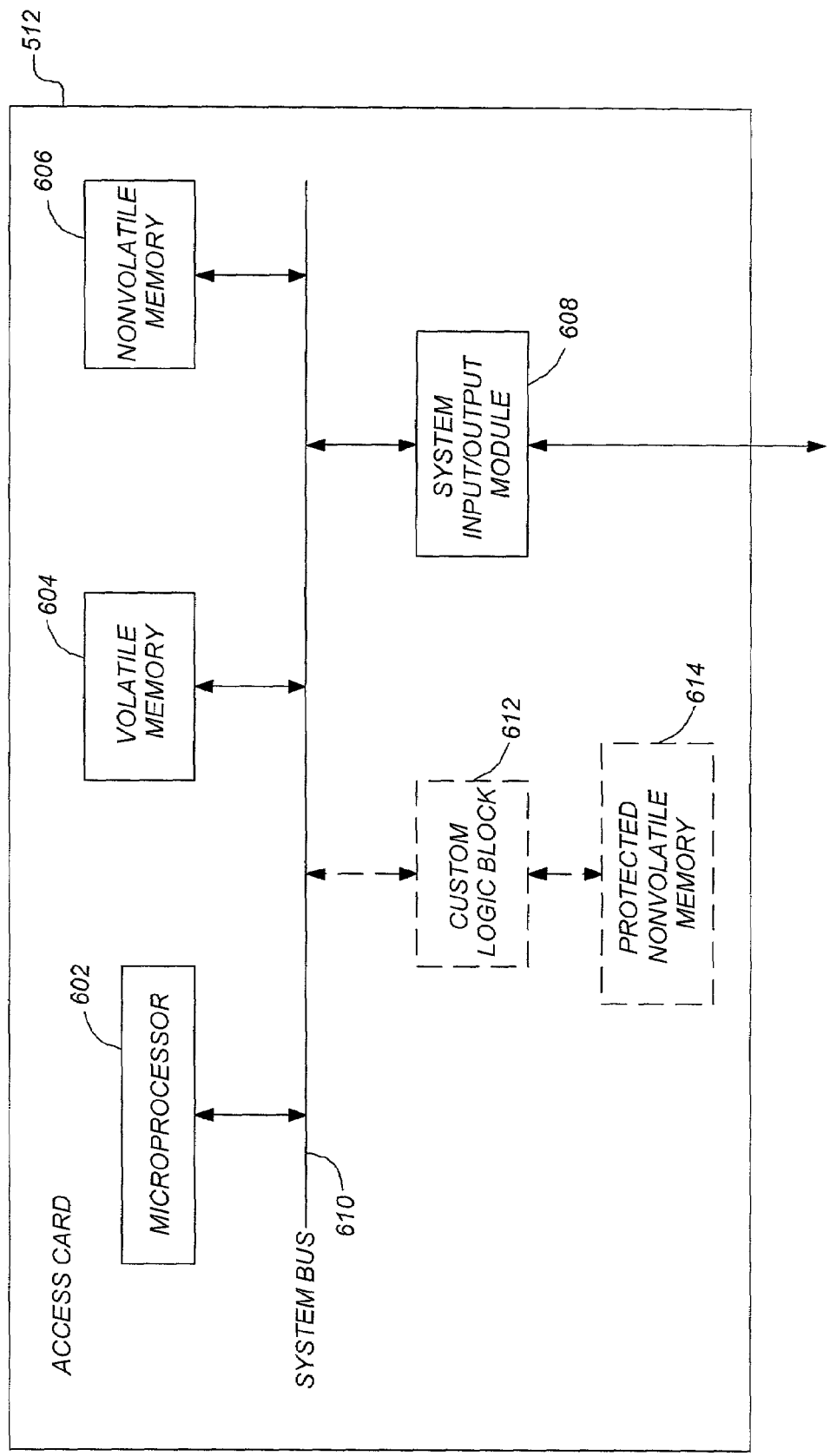
FIG. 6 illustrates the architecture of a conditional access module in accordance with one or more embodiments of the invention.

FIG. 6 illustrates the architecture of a CAM 512 in accordance with one or more embodiments of the invention. The CAM 512 contains a microprocessor 602, volatile memory components 604 (e.g., random access memory [RAM]), one or more nonvolatile memory components 606 (e.g., electrical erasable programmable read only memory [EEPROM], erasable programmable read only memory [EPROM], or batter packed RAM), and a system input/output module 608, all of which are communicatively coupled to a system bus 610. Additionally, one or more custom logic blocks 612 are utilized to control access to one or more protected nonvolatile memory components 614.

Allowable functions are defined by the state machine hardwired into the custom logic block 612. The state machine cannot be redefined through external manipulation of the system I/O module 608, system bus 610, or microprocessor 602. Any modification must be done through extremely expensive invasive attacks to modify the imbedded hardware.

If the microprocessor 602 or memory access control unit was permitted direct access to the nonvolatile memory component 614, a more flexible and broader range of operations on the memory 614 may be provided, but at significantly higher risk of misuse. However, in the present invention, the use of the memory 614 is constrained because possible operations are confined to that permitted by the custom logic block 612. Nonetheless, this property has an intended effect in that the operations are bound by the functions contained within the custom logic block 612. Since the custom logic block 612 performs a fixed algorithm, it cannot be modified by external means thereby protecting the dedicated memory component 614.

Accordingly, by limiting misuse using a custom logic block 612 and protected memory 614, the integrity of the system's 512 security remains intact. The limited operation provided by the state machine (that implements the custom logic block 612) cannot be manipulated through external, low cost means by the system bus 610 or system I/O module 608. Preventing low cost attacks forces attackers to use expensive invasive attacks that are not available to the vast majority of pirates. Further compromise of one device through an internal, invasive attack does not typically lead to a successful attack through a low cost, external attack.

The microprocessor's 602 nonvolatile memory component 606 and the protected dedicated memory component 614 of the custom logic block 612 may use the same physical and logical address ranges since they are controlled and programmed by separate entities. Alternatively, the two memory components 606 and 614 may use separate address ranges as the system designer sees fit. This helps obscure use of the memory by potential attackers making it more difficult to determine the memory map and usage of code segments within the CAM 512.

Additionally, the two nonvolatile memory components 606 and 614 may share programming charge pumps and programming control. If the pumps and/or programming control are shared, care should be taken to ensure that data and address lines of the dedicated nonvolatile memory component 614 are routed only to the custom logic block 612. This saves chip area and reduces chip cost. Accordingly, the microprocessor 602 cannot provide control information that may lead to a subsequent attack on the dedicated memory component 614. Sharing the charge pumps may be preferred to ease timing and high voltage requirements of the entire chip within CAM 512.

There are many advantages to dedicating a modifiable protected nonvolatile memory component 614 to a custom logic block 612. For example, the protected nonvolatile memory component 614 can withstand substantial external attacks without inappropriately modifying the contents of the dedicated memory components 614. Further, the identity of the device (i.e., the CAM 512) is protected for use in operations with the CAM 512, IRD 126, and headend. For example, the CAM 512 provides non-modifiable uniqueness (i.e., stored in protected memory 614) that can be used to prevent cloning of the CAM 512 to obtain unauthorized access. Additionally, the CAM 512 may provide an IRD 126 for non-modifiable pairing and blacklist, and may provide a headend that controls access rights and blacklist. A blacklist is utilized to prevent CAMs 512 with a particular identification to be used/cloned. With a blacklist, the headend may provide a list of blacklisted/unauthorized cards to an IRD 126. The IRD 126 then refuses to grant access rights if the CAM 512 being utilized is on the blacklist. Accordingly, uniquely identified CAMs 512 with a unique identification that is only accessible through a custom logic block 612 may be utilized to prevent unauthorized access and cloning. By preventing the system I/O module 608, system bus 610, microprocessor 602, or memory access control unit from directly accessing the protected nonvolatile memory component 614, traditionally successful security comprises are no longer possible.

Figure 7:
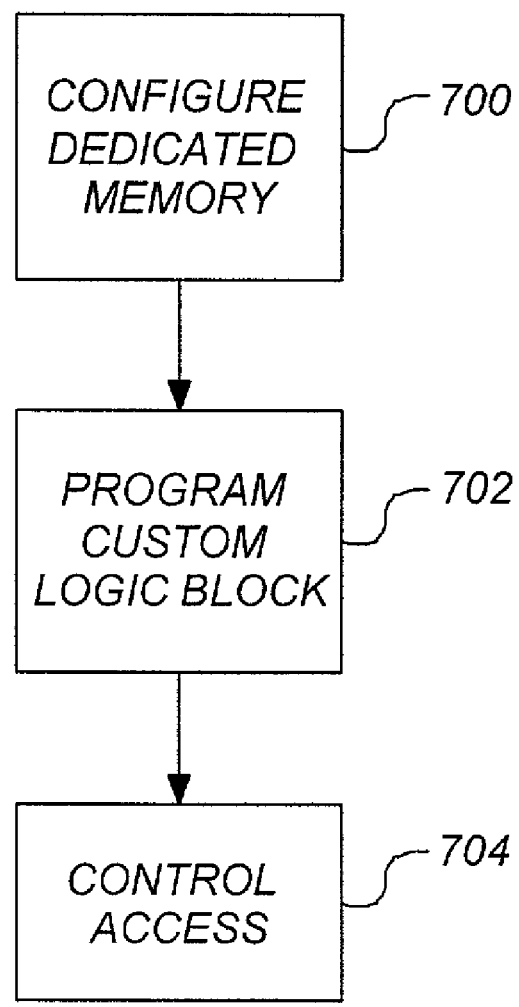
FIG. 7 is a flow chart illustrating the use of dedicated nonvolatile memory in accordance with one or more embodiments of the invention.

FIG. 7 is a flow chart illustrating the use of dedicated nonvolatile memory 614 in accordance with one or more embodiments of the invention. At step 700, a dedicated/protected nonvolatile memory component 614 is configured. The dedicated memory component 614 is configured to contain state information to provide desired functionality and enforce one or more security policies for accessing digital services. The dedicated memory component 614 may utilize the same physical and logical address ranges as a microprocessor's 602 nonvolatile memory component. At step 702, the custom logic block 612 is programmed. For example, the custom logic block 612 may be programmed with a fixed algorithm that cannot be altered by external means. Such programming may be implemented in solid state hardware that implements a simple and well defined state machine.

At step 704, access to the protected nonvolatile memory component 614 is controlled by the custom logic block 612. For example, access to a block of the protected memory component 614 may be limited to one or more functions defined in the custom logic block 612. Further, the protected memory component 614 may not be accessible through a system input/output module 608, system bus 610, microprocessor 602, or external environment. Also, the protected memory component 614 is exclusively controlled through the custom logic block 612 and does not require the use of a system bus 610 or microprocessor 602.

Accordingly, memory 614 content protection is significantly improved through isolation of the memory component 614 from the system I/O module 608, the system bus 610, and/or microprocessor 602, except as necessary during the manufacturing process. The manipulation of memory 614 content is reduced through direct connection of a fixed state machine (i.e., the custom logic block 612) and not to the system bus 610. Such control by the limited functions provided by the fixed operation of a state machine improves the integrity of memory.

CONCLUSION

This concludes the description of one or more embodiments of the present invention. The foregoing description of the invention has been presented for the purposes of illustration and description. It is not intended to be exhaustive or to limit the invention to the precise form disclosed. Many modifications and variations are possible in light of the above teaching. Accordingly, the invention is not limited to smart card applications or to a particular digital service system.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for controlling access to digital services comprising:
    (a) a control center configured to coordinate and provide digital services;
    (b) an uplink center configured to receive the digital services from the control center and transmit the digital services to a satellite;
    (c) the satellite configured to:
        (i) receive the digital services from the uplink center;
        (ii) process the digital services; and
        (iii) transmit the digital services to a subscriber receiver station;
    (d) the subscriber receiver station configured to:
        (i) receive the digital services from the satellite;
        (ii) control access to the digital services through an integrated receiver/decoder (IRD);
    (e) a conditional access module (CAM) communicatively coupled to the IRD, wherein the CAM comprises:
        (i) a protected nonvolatile memory component, wherein:
            (1) the protected nonvolatile memory component is used to contain state information to provide desired functionality and enforce one or more security policies for accessing the digital services;
            (2) programming control and a programming charge pump are shared by both the protected nonvolatile memory component and a microprocessor's non-protected nonvolatile memory component; and
            (3) the microprocessor's non-protected nonvolatile memory component and the protected nonvolatile memory component use physical and logical address ranges that are the same; and
        (ii) a fixed state custom logic block configured to control access to the nonvolatile memory component, wherein data and address lines of the protected nonvolatile memory component are routed only to the fixed state custom logic block.

2. The system of claim 1 wherein the custom logic block has a fixed algorithm that cannot be altered by external means.

3. The system of claim 1 wherein access to a block of the protected nonvolatile memory component is limited to one or more functions defined in the custom logic block.

4. The system of claim 1 wherein the custom logic block is implemented in solid state hardware that implements a simple and well defined state machine.

5. The system of claim 1 wherein the protected nonvolatile memory component is not accessible through a system input/output module, system bus, microprocessor, or eternal environment.

6. The system of claim 1 wherein the nonvolatile memory component is exclusively controlled through the custom logic block and does not require the use of a system bus or microprocessor.

7. The system of claim 1 wherein a microprocessor's nonvolatile memory component and the protected nonvolatile memory component use the same physical and logical address ranges.

8. A method for limiting unauthorized access to digital services comprising:
    (a) configuring a protected nonvolatile memory component, wherein:
        (i) the protected nonvolatile memory component is used to contain state information to provide desired functionality and enforce one or more security policies for accessing the digital services;
        (ii) programming control and a programming charge pump are shared by both the protected nonvolatile memory component and a microprocessor's non-protected nonvolatile memory component; and
        (iii) the microprocessor's non-protected nonvolatile memory component and the protected nonvolatile memory component use physical and logical address ranges that are the same;
    (b) controlling access to the nonvolatile memory component through a fixed state custom logic block, and wherein data and address lines of the protected nonvolatile memory component are routed only to the fixed state custom logic block.

9. The method of claim 8 wherein the custom logic block has a fixed algorithm that cannot be altered by external means.

10. The method of claim 8 wherein access to a block of the protected nonvolatile memory component is limited to one or more functions defined in the custom logic block.

11. The method of claim 8 wherein the custom logic block is implemented in solid state hardware that implements a simple and well defined state machine.

12. The method of claim 8 wherein the protected nonvolatile memory component is not accessible through a system input/output module, system bus, microprocessor, or external environment.

13. The method of claim 8 wherein the nonvolatile memory component is exclusively controlled through the custom logic block and does not require the use of a system bus or microprocessor.

14. The method of claim 8 wherein a microprocessor's nonvolatile memory component and the protected nonvolatile memory component use the same physical and logical address ranges.

15. A conditional access module (CAM), comprising:
(a) a protected nonvolatile memory component, wherein:
  (i) the protected nonvolatile memory component is used to contain state information to provide desired functionality and enforce one or more security policies for accessing digital services;
  (ii) programming control and a programming charge pump are shared by both the protected nonvolatile memory component and a microprocessor's non-protected nonvolatile memory component; and
  (iii) the microprocessor's non-protected nonvolatile memory component and the protected nonvolatile memory component use physical and logical address ranges that are the same; and
(b) a fixed state custom logic block configured to control access to the nonvolatile memory component, and wherein data and address lines of the protected nonvolatile memory component are routed only to the fixed state custom logic block.

16. The CAM of claim 15 wherein the custom logic block has a fixed algorithm that cannot be altered by external means.

17. The CAM of claim 15 wherein access to a block of the protected nonvolatile memory component is limited to one or more functions defined in the custom logic block.

18. The CAM of claim 15 wherein the custom logic block is implemented in solid state hardware that implements a simple and well defined state machine.

19. The CAM of claim 15 wherein the protected nonvolatile memory component is not accessible through a system input/output module, system bus, microprocessor, or external environment.

20. The CAM of claim 15 wherein the nonvolatile memory component is exclusively controlled through the custom logic block and does not require the use of a system bus or microprocessor.

21. The CAM of claim 15 wherein a microprocessor's nonvolatile memory component and the protected nonvolatile memory component use the same physical and logical address ranges.

22. An article of manufacture for preventing unauthorized access to digital services comprising:
(a) means for configuring a protected nonvolatile memory component, wherein:
  (i) the protected nonvolatile memory component is used to contain state information to provide desired functionality and enforce one or more security policies for accessing the digital services;
  (ii) programming control and a programming charge pump are shared by both the protected nonvolatile memory component and a microprocessor's non-protected nonvolatile memory component; and
  (iii) the microprocessor's non-protected nonvolatile memory component and the protected nonvolatile memory component use physical and logical address ranges that are the same; and
(b) means for controlling access to the nonvolatile memory component through a fixed state custom logic block, and wherein data and address lines of the protected nonvolatile memory component are routed only to the fixed state custom logic block.

23. The article of manufacture of claim 22 wherein the custom logic block has a fixed algorithm that cannot be altered by external means.

24. The article of manufacture of claim 22 wherein access to a block of the protected nonvolatile memory component is limited to one or more functions defined in the custom logic block.

25. The article of manufacture of claim 22 wherein the custom logic block is implemented in solid state hardware that implements a simple and well defined state machine.

26. The article of manufacture of claim 22 wherein the protected nonvolatile memory component is not accessible through a system input/output module, system bus, microprocessor, or external environment.

27. The article of manufacture of claim 22 wherein the nonvolatile memory component is exclusively controlled through the custom logic block and does not require the use of a system bus or microprocessor.

28. The article of manufacture of claim 22 wherein a microprocessor's nonvolatile memory component and the protected nonvolatile memory component use the same physical and logical address ranges.

* * * * *